Oct. 15, 1963  G. HERR ETAL  3,106,853
CRANK HANDLES FOR WINDOW ACTUATING MECHANISMS
IN AUTOMOTIVE VEHICLES AND THE LIKE
Filed Feb. 9, 1960
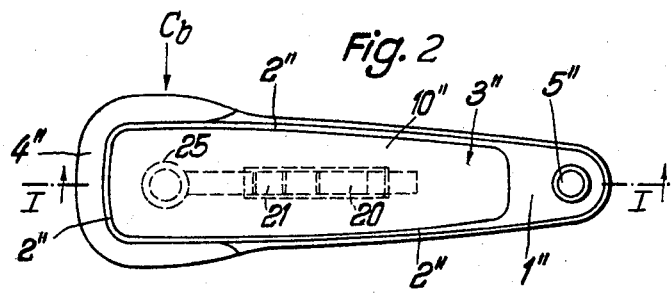
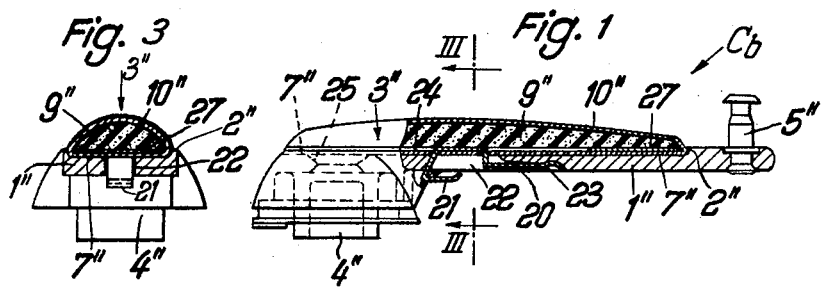
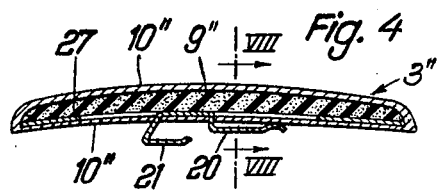
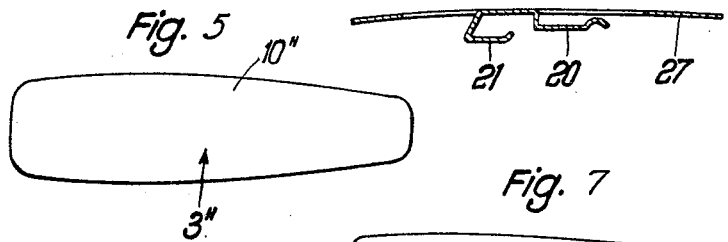
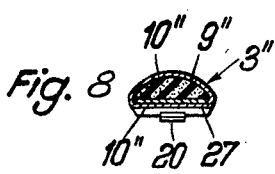
Inventors.
GERHARD HERR
KURT CZIPTSCHIRSCH
BY Michael S. Striker
their ATTORNEY

United States Patent Office 3,106,853
Patented Oct. 15, 1963

3,106,853
CRANK HANDLES FOR WINDOW ACTUATING MECHANISMS IN AUTOMOTIVE VEHICLES AND THE LIKE
Gerhard Herr, Wuppertal-Vohwinkel, and Kurt Cziptschirsch, Wuppertal-Elberfeld, Germany, assignors to Gebr. Happich G.m.b.H., Wuppertal-Elberfeld, Germany
Filed Feb. 9, 1960, Ser. No. 7,693
4 Claims. (Cl. 74—545)

The present invention relates to crank handles in general, and more particularly to improvements in padded or upholstered crank handles of the type utilized to operate the mechanisms for lifting and lowering of windows in automotive vehicles and the like.

It was already proposed to construct crank handles intended for use in the interior of automotive vehicles in such a way as to prevent injury to passengers who may be thrown against such handles in the course of a traffic accident. As is known, the crank handles extend at least partially from the inner side of the automobile frame, and therefore, were they not padded or partly concealed, they could cause serious injury to the occupants. According to one prior proposal, the arm of the crank handle is formed as a fully upholstered body having a groove or channel for reception of a pivotable button-shaped actuating member by means of which the handle may be rotated. The actuating member may be partially or even fully concealed in the upholstered crank handle whose padding projects beyond the actuating member in the latter's idle position and prevents direct impact against the normally unyielding actuating member. A serious drawback of such constructions is that it is very difficult to properly apply the upholstering or padding envelope about the crank arm in such a way that the padding can resist the wear and tear for longer periods of time. Therefore, it was already proposed to manufacture the padding in the form of a bag which is removably applied over the crank arm and carries means for sealing its ends. It has been found, however, that the use of a bag-shaped padding for the crank arm prevents rapid connection or separation of a so-constructed crank handle from the window actuating mechanism and, in addition, the padding generates considerable friction between the crank arm and the automobile frame since the crank arm should extend only slightly from the inner side of the wall in which the up and down movable window is installed. The frictional forces obstruct the operation of the window actuating mechanism in that they prevent a passenger from rapidly and freely rotating the crank handle.

An important object of the present invention is to provide a very simple and safe crank handle for window actuating mechanisms in automotive vehicles and the like whose impact-absorbing padding is applied in such a way that it in no way impedes the rotation of the handle with respect to the automobile frame.

Another object of the invention is to provide a padded crank handle of the above outlined characteristics wherein the mounting of the padding is such as to be readily separable from the crank arm without separation of the crank handle from the window actuating mechanism.

A further object of the invention is to provide a padded crank handle whose arm is connected with the padding in such a way that the padding does not generate frictional forces even if the arm is mounted in immediate proximity of the wall in which the vertically movable window and its actuating mechanism is installed.

An additional object of the instant invention is to provide a padded crank handle which is constructed and assembled in such a way that the padding is not likely to be accidentally separated from the crank arm when the handle is put to actual use.

A concomitant object of the present invention is to provide a padded crank handle whose padding may be readily separated from the crank arm and replaced by a padding of different yieldability, configuration or thickness.

Still another object of the invention is to provide a padded crank handle for the actuating mechanisms of windows in automotive conveyances and the like which may be manufactured of readily available and comparatively cheap materials, and whose padding is mounted in such a way that it is subjected to little wear and tear when the crank handle is put to repeated use for extended periods of time.

An additional object of the invention is to provide a padded crank handle of the above outlined characteristics which may be put to use wherever the crank arm may cause injury to a person resulting from an accidental impact thereagainst.

With the above objects in view, the invention resides essentially in the provision of a crank handle whose preferably flat, plate-like crank arm is releasably connectable with a one-piece pad or upholstering member. This pad is adjacent to the outer or exposed side of the crank arm and is connected to the latter in such a way that the inner side of the crank arm may remain smooth, i.e. without any protuberances, in order to avoid the generation of frictional forces between the crank arm and the inner side of the automobile frame. In addition, since the pad is adjacent to the outer side of the crank arm, the latter's rotary movements cannot weaken or terminate its connection with the pad and, moreover, the thickness of the pad may be increased at will without making it necessary to move the inner side of the crank arm further away from the automobile frame. Finally, since the pad is fixed to that side of the crank arm which is turned away from the inner side of the automobile frame, it is exposed to little wear and tear though it can always effectively prevent the impact of a passenger's body against the non-yieldable component parts of the crank handle.

The cushioning pad preferably extends along the entire exposed side of the crank arm and is fixed to the latter with the help of clamping and/or snap-on means which may form part of the pad or of the crank arm. As stated hereinabove, the pad constitutes a one-piece self-supporting unit which is readily connectable with and separable from the crank arm, for example, when it is desired to expose a screw or a like retaining device which connects the customary nave carried by the crank arm with the shaft of the window actuating mechanism. Thus, the pad may be connected to and may be separated from the crank arm before or after the improved crank handle is installed in an automobile or a like conveyance. Since the pad preferably covers the entire or at least the major portion of the exposed side of the crank arm, it also fully covers the aforementioned screw which fixes the crank handle to the shaft of the window actuating mechanism.

The readily separable clamping and/or snap-on connection between the pad and the crank arm may consist of a circumferential flange formed on the crank arm and defining an endless groove for receiving the circumferential seam or edge of the pad. According to a slight modification of the invention, the connection between the pad and the crank arm may comprise a number of resilient tongues or clips carried by the pad and receivable in suitable cutouts and depressions of the crank arm without, however, projecting beyond the latter's inner side. It is also advisable to form the outer side of the crank arm with a trough-shaped depression for the pad bounded by an undercut edge which engages with and releasably retains the circumferential edge of the pad.

The pad preferably comprises a cushion or insert consisting of a soft synthetic plastic material which is wrapped into a yieldable plastic jacket. The jacket may be made in one piece which receives the cushion and may include a base plate formed with one, two or more tongues engageable with the crank arm.

The crank handle of the present invention preferably utilizes an elastic button-shaped actuating member of the type disclosed in our copending application Serial No. 7,650, filed on Feb. 9, 1960, now U.S. Patent No. 3,071,023. This actuating member is also constructed with a view to prevent injury to a passenger in the event of a traffic accident.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

FIG. 1 is partly side elevational and partly longitudinal sectional view of a crank handle wherein the base plate of the pad is inserted into a shallow recess of the crank arm and is releasably fixed thereto by a pair of clip-like retaining elements, the section being taken along the line I—I of FIG. 2, as seen in the direction of arrows;

FIG. 2 is a top plan view of the crank handle shown in FIG. 1.

FIG. 3 is a transverse section taken along the line III—III of FIG. 1, as seen in the direction of arrows;

FIG. 4 is a longitudinal section through the removable pad of the crank handle shown in FIGS. 1–3.

FIG. 5 is a top plan view of the pad shown in FIG. 4;

FIG. 6 is a longitudinal central section through the base member or bottom plate of the pad shown in FIGS. 4 and 5;

FIG. 7 is a top plan view of the plate shown in FIG. 6; and

FIG. 8 is a transverse section taken along the line VIII—VIII of FIG. 4, as seen in the direction of arrows.

Referring now in greater detail to the drawings, the crank handle $C_b$ of FIGS. 1–3 comprises an elongated crank arm 1''' whose ends are connected with a nave 4'' and with a pin 5'', respectively. The actuating button which is normally mounted on the pin 5'' has been omitted from the drawings. The exposed side of the crank arm 1'' is formed with an elongated trough-shaped shallow recess or depression 7'' whose circumferential edge or wall 2'' is slightly undercut as can be observed in the right-hand half of FIG. 1. The wall 2'' actually constitutes a flange which projects beyond the outer side of the crank arm 1''.

The depression 7'' receives a pad 3'' which comprises a base plate 27, a shaped cushioning insert 9'' on the plate 27, and a deformable jacket or envelope 10'' for the components 9'', 27. The pad 3'' is releasably snapped into the depression 7'' whereby its circumferential edge passes over and is received below the undercut edge or flange 2'' of the crank arm 1''. As best shown in FIG. 6, the base plate 27 is formed with two resilient retaining or connecting elements 20, 21 which are stamped from the body of member 27 and are bent into the shape of clips or tongues projecting through the envelope 10'' (see FIG. 4) and extendable through a cutout 22 in the crank arm 1''. Each of clips 20, 21 has a first portion bent out of the general plane of the base plate 27 and a second portion which is bent into a plane substantially parallel with the plane of the plate 27. The latter consists of resilient material, such as spring steel or a suitable plastic substance. The second portions of both tongues are bent in the same direction. The underside of the crank arm 1'' is formed with a depression 23 which terminates at the cutout 22 and receives the tongue 20 when the parts 1'', 3'' are assembled in the manner best shown in FIG. 1.

The other tongue 21 then abuts against an inclined wall 24 in the cutout 22. It will be noted that only the tongue 21 projects slightly beyond the inner side of the crank arm 1''; the other tongue is fully received in the depression 23.

The pad 3'' is normally affixed to the exposed side of the crank arm 1'' after a nave 4'' is already connected with the shaft of the non-represented window actuating mechanism. The connection between the nave 4'' and the shaft may consist of a screw whose head is then received in the sunk hole 25 indicated in broken lines in FIG. 1. The nave has a coaxial bore which communicates with the hole 25. In affixing the pad 3'', the free end of the tongue 20 is introduced into the cutout 22 and pushed in a direction to the right (FIG. 1) to enter the depression 23, whereupon the second tongue 21 is also free to enter the cutout 22 and to abut against the wall 24. A slight finger pressure is then sufficient to snap the edge of the pad 3'' beneath the undercut flange 2'' of the crank arm 1'' and to simultaneously force the tongue 21 into the position of FIG. 1, i.e., into actual abutment with the inclined wall 24.

The parts 1'', 3'' may be readily separated without any damage to the pad, for example, if it is desired to remove the connecting screw which secures the nave 4'' to the shaft of the window actuating mechanism. The procedure is then reversed, i.e., the tongue 21 is forced out of the cutout 22 whereupon the operator merely slides the pad 3'' in parallelism with the crank arm 1'' in order to move the tongue 20 from its depression 23, and finally withdraws the member 20 through the cutout 22.

As stated hereinabove, the plate 27 preferably consists of resilient metallic material, but it can be made of a synthetic plastic substance, if desired. In fact, all component parts of the crank handle $C_b$ may be made of synthetic plastic material.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A crank handle comprising, in combination, a plate-like crank arm having a smooth inner side, an outer side, a trough-shaped depression formed in said outer side, an undercut flange extending about said depression, and at least one cutout extending between said depression and said inner side; and a one-piece pad comprising a layer of cushioning material, a yieldable envelope surrounding said layer and having a circumferential edge, and at least one resilient tongue-like retaining element extending from said envelope, said pad received in said depression in such manner that the flange of said arm engages with and releasably holds the edge of said envelope, and the retaining element extending into said cutout and engaging with said arm to releasably hold the pad in said depression.

2. A crank handle comprising, in combination, a plate-like crank arm having a smooth inner side, an outer side, a trough-shaped depression formed in said outer side, an undercut flange extending about said depression, and at least one cutout extending between said depression and said inner side; and a one-piece pad comprising a layer of cushioning material, a yieldable envelope surrounding said layer and having a circumferential edge, and a base plate of resilient material received in said envelope and having at least one tongue-like retaining element projecting through the envelope, said pad received in said depression in such manner that the base plate is adjacent to the crank arm and that the flange of said arm engages with and releasably retains the edge of said envelope, said retaining element extending into and through said cutout and engaging with said arm for releasably holding the pad in said depression together with said flange.

3. A crank handle comprising, in combination, a plate-like crank arm having a smooth inner side, an outer side, a trough-shaped depression formed in said outer side, an undercut flange extending about said depression, and a cutout extending between said depression and said inner side; and a one-piece pad comprising a layer of cushioning material consisting of foam rubber, a yieldable envelope surrounding said layer and having a circumferential edge, and a steel plate received in said envelope and having a pair of tongue-like retaining elements stamped from its body and projecting through the envelope, said pad received in said depression in such manner that the plate is adjacent to the crank arm and that the flange of said arm engages with and releasably retains the edge of said envelope, said retaining elements extending into and through said cutout and engaging with said arm for releasably holding the pad in said depression together with said flange.

4. A crank handle comprising, in combination, a plate-like crank arm having a smooth inner side formed with a first depression, an outer side formed with a trough-shaped second depression, an undercut flange extending about said second depression, a cutout extending between said first and second depressions, and an inclined wall in said cutout; and a one-piece pad comprising a layer of cushioning material, a yieldable envelope surrounding said layer and having a circumferential edge, and a base plate of resilient material in said envelope adjacent to said layer, said plate having a pair of tongue-like retaining elements bent in the same direction and projecting through said envelope, said pad received in said second depression in such manner that the flange of said arm engages with and releasably holds the edge of said envelope, said base plate being adjacent to said crank arm and said retaining elements extending through said cutout in such manner that one thereof is received in said first depression and the other thereof engages with said inclined wall.

References Cited in the file of this patent

UNITED STATES PATENTS

| | | |
|---|---|---|
| 329,321 | Leger et al. | Oct. 27, 1885 |
| 1,373,782 | West | Apr. 5, 1921 |
| 1,938,871 | Smith | Dec. 12, 1933 |
| 2,063,827 | Place | Dec. 8, 1936 |
| 2,070,839 | Place | Feb. 16, 1937 |
| 2,125,783 | Heeman | Aug. 2, 1938 |
| 2,311,821 | Floraday | Feb. 23, 1943 |

FOREIGN PATENTS

| | | |
|---|---|---|
| 763,150 | France | Feb. 5, 1934 |